US007399526B2

(12) United States Patent  (10) Patent No.: US 7,399,526 B2
Dalmais et al.  (45) Date of Patent: Jul. 15, 2008

(54) PRINTING BLANKET AND METHOD FOR REDUCING CORROSION AND ABRASION OF PRINTING BLANKETS AND BLANKET CYLINDERS

(75) Inventors: Frederic Dalmais, Elancourt (FR); Jean Boret, Limay (FR); Thomas Hower, Waynesville, NC (US)

(73) Assignee: Day International, Inc., Dayton, OH (US)

( * ) Notice: Subject to any disclaimer, the term of this patent is extended or adjusted under 35 U.S.C. 154(b) by 475 days.

(21) Appl. No.: 10/684,787

(22) Filed: Oct. 14, 2003

(65) Prior Publication Data
US 2004/0115446 A1 Jun. 17, 2004

Related U.S. Application Data

(60) Provisional application No. 60/417,967, filed on Oct. 11, 2002.

(51) Int. Cl.
*B32B 7/12* (2006.01)
*B32B 15/04* (2006.01)
*B41F 7/02* (2006.01)

(52) U.S. Cl. .................. 428/344; 428/457; 428/909; 101/217

(58) Field of Classification Search .................. 428/99, 428/188, 222, 344, 909, 457; 101/217
See application file for complete search history.

(56) References Cited

U.S. PATENT DOCUMENTS

| 2,752,280 | A |   | 6/1956  | Cookes et al. |          |
|-----------|---|---|---------|---------------|----------|
| 4,471,011 | A |   | 9/1984  | Sporing       | 428/68   |
| 4,766,811 | A | * | 8/1988  | Linska        | 101/415.1|
| 5,006,400 | A |   | 4/1991  | Pinkston et al.| 428/229 |
| 5,352,507 | A | * | 10/1994 | Bresson et al.| 428/35.9 |
| 5,364,683 | A |   | 11/1994 | Flint et al.  | 428/141  |
| 5,366,784 | A | * | 11/1994 | Herbison      | 428/141  |
| 5,366,799 | A |   | 11/1994 | Pinkston et al.| 428/250 |
| 5,644,985 | A |   | 7/1997  | Serain et al. | 107/415.1|
| 5,700,343 | A |   | 12/1997 | Castelli et al.| 156/295 |
| 6,019,042 | A |   | 2/2000  | Batti et al.  | 101/376  |

(Continued)

FOREIGN PATENT DOCUMENTS

DE  43 15 311 A  11/1994

(Continued)

*Primary Examiner*—Kevin R. Kruer
(74) *Attorney, Agent, or Firm*—Dinsmore & Shohl LLP

(57) ABSTRACT

A printing blanket and method of reducing corrosion and abrasion of printing blankets and printing blanket cylinders is provided. The printing blanket includes a metal base ply having first and second surfaces, a surface layer on the first surface of the base ply, and a polymer on the second surface of the base ply. The polymer functions to protect the metal base ply as well as a blanket cylinder surface from abrasion and exposure to moisture and corrosive agents used during a printing process. The polymer preferably comprises ethylene vinyl acetate copolymers, nylon, polyester, polyurethane, or polyethylene. The polymer may be applied to the in the form of an emulsion which is coated or sprayed onto the base ply, or the polymer may be provided in the form of a film or sheet which is adhered to the base ply with an adhesive. Preferably, the polymer includes corrosion inhibiting additives which are released when the blanket is compressed during a printing operation, further reducing corrosion.

9 Claims, 1 Drawing Sheet

U.S. PATENT DOCUMENTS 6,205,922 B1 3/2001 Henry et al. ................ 101/376
6,209,455 B1 4/2001 Simeth

FOREIGN PATENT DOCUMENTS

| | | | |
|---|---|---|---|
| DE | 44 32 853 A | | 3/1996 |
| DE | 196 20 999 A | | 12/1997 |
| EP | 0 372 719 A | | 6/1990 |
| JP | 59209198 | | 11/1984 |
| JP | 60225799 A2 | | 11/1985 |
| JP | 08-027439 | * | 1/1996 |
| WO | 9301003 | * | 1/1993 |
| WO | WO 93/01003 | | 1/1993 |

* cited by examiner

PRINTING BLANKET AND METHOD FOR REDUCING CORROSION AND ABRASION OF PRINTING BLANKETS AND BLANKET CYLINDERS

CROSS-REFERENCE TO RELATED APPLICATIONS

This application claims the benefit of U.S. Provisional Application Serial No. 60/417,967, filed Oct. 11, 2002.

BACKGROUND OF THE INVENTION

This invention relates to a printing blanket and method of reducing corrosion and abrasion of printing blankets and printing blanket cylinders, and more particularly, to a metal-backed printing blanket including a protective polymeric film layer on the outer surface of the metal backing which contacts the surface of the printing cylinder when the blanket is mounted thereon.

One of the most common commercial printing processes is offset lithography. In this printing process, ink is offset from a printing plate to a rubber-surfaced printing blanket mounted on a printing cylinder before being transferred to a substrate, such as paper. The blanket cylinder generally comprises a chrome or nickel-plated steel cylinder having an encircling rubber printing blanket which is releasably mounted to the cylinder.

The printing blanket is generally reinforced with either a fabric backing or a metal backing. Unlike the fabric backing, which exhibits a high degree of stretch, the metal backing avoids stretching of the blanket when it is tensioned on the blanket cylinder, which provides better print quality and eliminates the need for frequent retensioning of the blanket.

However, the use of metal-backed printing blankets has resulted in a greater potential for corrosion and abrasion of the printing blanket as well as the blanket cylinder surface. The use of water, inks and chemicals during the printing process results in an accumulation of moisture between the printing blanket and the cylinder surface. After extended use, this accumulation of moisture can cause corrosion of the metal backing on the printing blanket as well as the surface of the blanket cylinder. In addition, the intimate contact of the metal backing of the printing blanket with the metal surface of a blanket cylinder and the rapid rotation of the two results in a build-up of friction which abrades the surface of the blanket cylinder, also contributing to corrosion.

Many efforts have been made to reduce or eliminate corrosion of printing blanket cylinders. For example, blanket cylinders have been developed which are comprised of corrosion-resistant materials such as stainless steel. More recently, blanket cylinders have had ceramic materials applied to the surfaces thereof in an attempt to reduce or eliminate corrosion. However, the use of such materials alone has not been found to fully eliminate corrosion and abrasion problems.

Printing blankets have also been modified in an attempt to reduce corrosion. For example, metals such as zinc have been incorporated into the backing layers of printing blankets. Such metals act as sacrificial metals which are more chemically active than the metal contained in the cylinders. See U.S. Pat. No. 5,366,784 and EP Patent No. 0593593.

Other attempts have been made to apply a rubber coating on the fabric base of a printing blanket to restrict the wicking of moisture beneath the blanket and/or to eliminate abrasion during contact of the blanket with the cylinder surface. See, for example, Spöring, U.S. Pat. No. 4,471,011, and Pinkston et al., U.S. Pat. No. 5,006,400. However, such methods have been used in conjunction with fabric backings. It would be desirable to be able to provide corrosion and abrasion resistance while maintaining the benefits provided by the use of metal-backed blankets.

Accordingly, there is still a need in the art for a base or backing for printing blankets used in offset printing operations which provides the desired printing properties while reducing corrosion and/or abrasion of the blanket and/or blanket cylinder.

SUMMARY OF THE INVENTION

The present invention meets those needs by providing a printing blanket having a metal backing which includes a protective polymer on its outer surface. The polymer covered metal backing comes into contact with the surface of a printing blanket cylinder, which is typically comprised or a ceramic or metal material. The protective polymer inhibits corrosion and abrasion of the metal backing of the blanket as well as the blanket cylinder surface by resisting the wicking of moisture, thus protecting the metal backing of the blanket from moisture and other corrosive agents. The protective polymer also reduces or eliminates abrasion between the metal blanket backing and underlying blanket cylinder.

According to one aspect of the present invention, a printing blanket for reducing corrosion and abrasion of printing blankets and blanket cylinders is provided which comprises at least one base ply comprised of metal having first and second major surfaces. The second surface of the base ply (i.e., the side facing the blanket cylinder) includes a polymer, which is preferably selected from the group consisting of ethylene vinyl acetate copolymers, nylon, polyester, polyurethane, and polyethylene. The polymer preferably has a thickness of at least about 0.0005 inches (about 0.0013 cm), and preferably extends over substantially the entire second surface of said base ply.

The printing blanket further includes a surface layer on the first surface of the base ply. The surface layer is preferably formed of rubber-based materials and is adapted to receive ink to provide a printable surface.

The printing blanket may include additional layers as in conventional printing blankets. Preferably, the printing blanket includes an intermediate compressible layer positioned between the base ply and the surface layer. The printing blanket preferably further includes one or more reinforcing fabric plies. The fabric plies are preferably positioned between the compressible layer and the surface layer and/or between the base ply and the compressible layer.

The present invention also provides a method for reducing corrosion and abrasion of a printing blanket and blanket cylinder which comprises providing a printing blanket comprising at least one base ply comprised of metal having first and second surfaces and a surface layer on the first surface of the base ply; and applying a polymer to the second surface of the base ply.

The polymer is preferably applied to the base ply by coating or spraying. In this embodiment, the polymer is preferably applied in the form of an emulsion. In an alternative embodiment of the invention, the polymer is preferably applied in the form of a film or sheet which is adhered to the base ply with an adhesive.

In a preferred embodiment of the invention, the polymer includes corrosion inhibiting additives therein and/or thereon. Such additives may be added, for example, to the polymer coating prior to application to the base ply.

In an alternative embodiment of the invention, the polymer may comprise a multi-layer laminate including at least one corrosion inhibiting film layer.

The printing blanket may include additional layers as described above which may be prepared using methods which are known in the art.

The resulting printing blanket, when in use in a rotary offset printing process, functions as a barrier which inhibits corrosion and abrasion of the metal base ply of the printing blanket as well as the metal or ceramic surface of the blanket cylinder.

Accordingly, it is a feature of the present invention to provide a printing blanket having a protective polymer on a metal base ply to reduce corrosion and abrasion during contact with a metal or ceramic blanket cylinder. These, and other features and advantages of the present invention will become apparent from the following detailed description, the accompanying drawings, and the appended claims.

DETAILED DESCRIPTION OF THE PREFERRED EMBODIMENT

The printing blanket of the present invention provides several advantages in that the protective polymer inhibits corrosion and abrasion of the metal backing such that the blanket can retain the high print quality provided by the metal backing without the problem of corrosion. The protective polymer also inhibits corrosion of a metal blanket cylinder surface and reduces abrasion between the metal blanket backing and metal or ceramic blanket cylinder surface. The polymer may be applied in varying thicknesses such that it acts as a packing layer to adjust the overall thickness of the printing blanket. Thus, the polymer may also eliminate the need for packing the blanket to achieve the proper interference fit between the blanket and backing rolls in an offset press.

Figure 1:
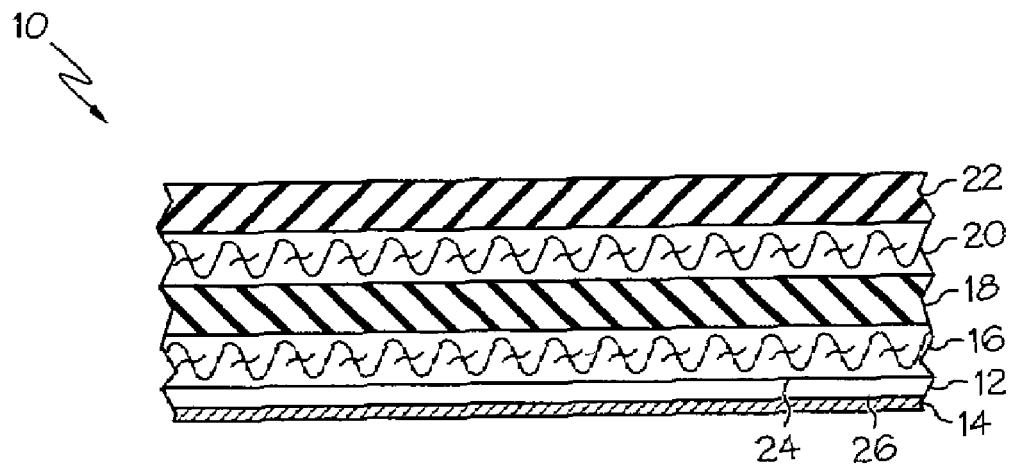
FIG. 1 is a cross-sectional view illustrating one embodiment of the printing blanket of the present invention.

Referring now to FIG. 1, one embodiment of the printing blanket construction of the present invention is illustrated. The printing blanket 10 includes a base ply 12 having first and second surfaces 24 and 26. The second surface 26 of the base ply 12 is adapted to contact a printing blanket cylinder. The base ply preferably has a minimum thickness of at least 0.0005 inches. The base ply 12 is comprised of a metal such as stainless steel. It should be appreciated that other, less expensive metals may be used since the metal is protected by the polymer. However, due to exposure of moisture and corrosive agents on the sides and edges of the blanket, it is preferable to use stainless steel.

A polymer shown in the form of a film layer 14 is adhered to the second surface 26 of the base ply 12. Suitable polymers for use in the present invention include ethylene vinyl acetate copolymers, nylon, polyester, polyurethane, and polyethylene. The polymer preferably comprises an ethylene vinyl acetate copolymer. Other polymers may be used as long as they provide a continuous, non-permeable layer on the base ply and function to inhibit corrosion and abrasion. The polymer may be applied in the form of a film or sheet by adhering it to the base ply with a conventional adhesive. Alternatively, the polymer may be provided in the form of a polymeric emulsion which is sprayed or coated on the base ply 12 to form layer 14. The polymer may be cured, if required, using conventional techniques.

The thickness of the protective polymeric layer may vary from about 0.0005 inches (about 0.0013 cm) to about 0.20 inches (about 0.51 cm), as long as the printing blanket is maintained within gauge specifications and as long as a continuous, non-permeable layer is achieved. The overall thickness of the printing blanket may be adjusted by varying the thickness of the polymeric layer to provide a blanket requiring no packing.

Also as shown in FIG. 1, the blanket further includes a surface layer 22. The surface layer may be formed from any suitable elastomeric material which can be cured or finished to present a smooth, ink receptive surface, including both natural and synthetic rubbers.

The blanket may further include a reinforcing fabric ply 16, a compressible ply 18, and a second reinforcing fabric ply 20. The fabric plies are preferably comprised of low stretch fabrics which are conventionally known in the art. The fabric plies may be adhered to the base ply and compressible ply with conventional adhesives (not shown).

The various layers of the printing blanket may be prepared using conventional methods and materials known in the art, including the method disclosed in Gaworowski et al., U.S. Pat. No. 4,770,928, which is incorporated herein by reference.

Preferably, prior to application to the base ply, corrosion inhibiting additives are incorporated into the polymer. Such additives are preferably microencapsulated additives which contain corrosion inhibitors. The additives may be incorporated into the polymer, for example, by adding them in the form of a liquid or powder to the polymeric emulsion prior to coating onto the base ply. Alternatively, the additives may be impregnated into a film of the polymer.

Figure 2:
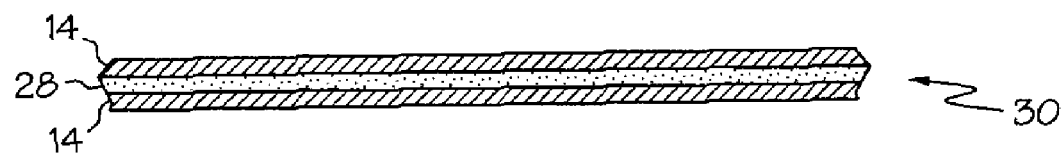
FIG. 2 is a cross-sectional view illustrating another embodiment of the printing blanket.

In an alternative embodiment illustrated in FIG. 2, the corrosion inhibiting additives may be incorporated in a separate film layer 28 which is incorporated into a multi-layer (two or more layers) laminate 30 including one or more protective polymeric layers 14. Preferably, the corrosion inhibiting film layer is sandwiched between two protective polymeric layers 14 as shown.

The corrosion inhibiting additives are then released when the blanket is compressed during a printing operation. Suitable corrosion inhibiting additives for use in the present invention include phenolic resins, phenolic phosphates, thioesters, zinc oxide, strontium chromate, strontium zinc phosphosilicates such as Halox® SZP-391, calcium phosphosilicates, such as Halox® CW-491, calcium borosilicate, such as Halox® CW-291, or other materials such as VCI (volatile corrosion inhibitors), which may be in the form of a film.

The printing blanket of the present invention may be used in conjunction with metal printing blanket cylinders and metal or ceramic covered printing blanket cylinders. A ceramic covered blanket cylinder suitable for use with the printing blanket of the present invention is found in printing presses from MAN Roland under the designation Roland REGIOMAN.

While certain representative embodiments and details have been shown for purposes of illustrating the invention, it will be apparent to those persons skilled in the art that various changes in the methods and apparatus disclosed herein may be made without departing from the scope of the invention.

What is claimed is:

1. A protective polymeric film for use on the surface of a metal base ply of a printing blanket which contacts a printing blanket cylinder, wherein said polymer is in the form of a multi-layer laminate comprising two or more polymer layers including at least one corrosion-inhibiting, non-permeable polymeric film layer therebetween, said corrosion-inhibiting polymeric film layer containing corrosion inhibiting additives.

2. A printing blanket for reducing corrosion and abrasion of printing blankets and blanket cylinders comprising at least one base ply comprised of metal having first and second major surfaces, a printable surface layer on said first surface of said base ply, and a protective polymer in the form of a film or sheet which is adhered to the second surface of said base ply with an adhesive for reducing corrosion of said base ply, said polymer having a thickness of at least 0.0013 cm.

3. The printing blanket of claim 2 wherein said polymer is selected from the group consisting of ethylene vinyl acetate copolymers, nylon polyester, polyurethane, and polyethylene.

4. The printing blanket of claim 2 wherein said polymer extends over substantially the entire second surface of said base ply.

5. The printing blanket of claim 2 wherein said polymer includes corrosion inhibiting additives therein and/or thereon.

6. The printing blanket of claim 2 wherein said polymer is in the form of a multi-layer laminate including at least one corrosion inhibiting film layer.

7. The printing blanket of claim 2 including an intermediate compressible layer positioned between said base ply and said surface layer.

8. The printing blanket of claim 7 including a reinforcing ply positioned between said compressible layer and said surface layer.

9. The printing blanket of claim of claim 7 including a reinforcing ply positioned between said base ply and said compressible layer.

* * * * *

UNITED STATES PATENT AND TRADEMARK OFFICE
CERTIFICATE OF CORRECTION

| | | |
|---|---|---|
| PATENT NO. | : 7,399,526 B2 | Page 1 of 1 |
| APPLICATION NO. | : 10/684787 | |
| DATED | : July 15, 2008 | |
| INVENTOR(S) | : Dalmais et al. | |

It is certified that error appears in the above-identified patent and that said Letters Patent is hereby corrected as shown below:

Col. 5, Line 14, Claim 3 "copolymers, nylon polyester, polyurethane" should read --copolymers, nylon, polyester, polyurethane--.

Signed and Sealed this

Ninth Day of November, 2010

David J. Kappos
*Director of the United States Patent and Trademark Office*